US00RE47163E

(19) United States
(12) Reissued Patent
Babikian et al.

(10) Patent Number: US RE47,163 E
(45) Date of Reissued Patent: Dec. 18, 2018

(54) BABY CHANGING STATION

(71) Applicant: BOBRICK WASHROOM EQUIPMENT, INC., North Hollywood, CA (US)

(72) Inventors: Dikran Babikian, Glendale, CA (US); Branko Bem, Plano, TX (US)

(73) Assignee: BOBRICK WASHROOM EQUIPMENT, INC., North Hollywood, CA (US)

(21) Appl. No.: 15/782,799

(22) Filed: Oct. 12, 2017

Related U.S. Patent Documents

Reissue of:
(64) Patent No.: 8,375,490
Issued: Feb. 19, 2013
Appl. No.: 12/221,918
Filed: Aug. 6, 2008

(51) Int. Cl.
*A47C 16/00* (2006.01)
*A47D 5/00* (2006.01)

(52) U.S. Cl.
CPC ..... *A47D 5/006* (2013.01)

(58) Field of Classification Search
CPC ..... A47D 5/00; A47D 5/003; A47D 5/006
See application file for complete search history.

(56) References Cited

U.S. PATENT DOCUMENTS 3,999,490 A 12/1976 Rocker et al. ..... A47D 5/006 108/27
4,363,459 A 12/1982 Holzer ..... E06B 9/323 248/257
4,573,608 A 3/1986 Hansen ..... A47D 5/003 221/92
5,086,527 A 2/1992 Takahashi et al. .... A47D 5/003 108/38
5,754,999 A 5/1998 Helmsderfer ..... A47D 5/003 108/38
5,906,015 A 5/1999 Hilger et al. ..... A47D 5/003 5/133
6,032,310 A 3/2000 Helmsderfer et al. ..... A47D 5/003 5/136
6,055,688 A 5/2000 Helmsderfer et al. ..... A47D 5/003 5/136

(Continued)

FOREIGN PATENT DOCUMENTS

DE 1 975 363 12/1967
DE 1975363 U * 12/1967

(Continued)

OTHER PUBLICATIONS

Translation of JP 2005-143635.*

*Primary Examiner* — Sara Clarke
(74) *Attorney, Agent, or Firm* — Lewis Roca Rothgerber Christie LLP

(57) ABSTRACT

A baby supporting device is provided which includes a frame. The frame includes a first portion for mounting onto a wall and a second portion pivotally coupled to the first portion and rotatable between a first position and a second position. A first stop member extends from the first portion, and a second stop member extends from the second portion, such that when the second stop member engages the first stop member it stops the second portion at the second position. A first surface covers at least a portion of the first portion, and a second surface covers at least a portion of the second portion.

36 Claims, 5 Drawing Sheets

(56) References Cited

U.S. PATENT DOCUMENTS

| | | | | |
|---|---|---|---|---|
| 6,151,737 | A * | 11/2000 | Henninge | A47C 17/40 5/136 |
| 6,269,503 | B1 | 8/2001 | Betker | A47D 5/003 5/655 |
| 7,331,551 | B2 | 2/2008 | Oddsen, Jr. | F16M 11/10 248/278.1 |
| D620,724 | S | 8/2010 | Presnell | D6/391 |
| 2002/0195911 | A1 | 12/2002 | Allen | D06F 81/06 312/241 |
| 2008/0209632 | A1 | 9/2008 | Presnell et al. | |
| 2008/0209635 | A1* | 9/2008 | Gonzalez | A61G 7/05769 5/600 |

FOREIGN PATENT DOCUMENTS

| | | | |
|---|---|---|---|
| JP | 11-299592 | | 11/1999 |
| JP | 11-299592 | A * | 11/1999 |
| JP | 2002-000410 | A * | 1/2002 |
| JP | 2003-052494 | | 2/2003 |
| JP | 2003-52494 | A * | 2/2003 |
| JP | 2005-143635 | A * | 5/2005 |
| JP | 2005-143635 | | 6/2005 |
| WO | WO 00/26100 | | 5/2000 |
| WO | WO00/26100 | A * | 5/2000 |

* cited by examiner

BABY CHANGING STATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION(S)*

*The present application is a reissue of U.S. Pat. No. 8,375,490 issued Feb. 19, 2013 filed as U.S. application Ser. No. 12/211,918 on Aug. 6, 2008, the entire contents of which are incorporated herein by reference.*

BACKGROUND

Baby changing stations are widely used especially in public facilities. Conventional baby changing stations generally have a base that is mounted vertically onto a wall and a support platform that it is hingedly mounted directly to the base. Typically, the base and platform are formed from a resinous or plastic material and react a majority, if not all, of the loads that the baby changing station is exposed to. Conventional baby changing stations are sufficiently strong to support the weight of a baby or a toddler. However, when excess weight is placed on such stations, as for example, when an adult exerts his or her own weight on the changing station or when two children are placed on the baby changing station, the weight limits of a baby changing station may be exceeded and the baby changing station may fail, possibly causing injury to those being supported by it. Therefore, stronger baby changing stations capable of withstanding excess loads are desired.

SUMMARY OF THE INVENTION

In an exemplary embodiment, a baby supporting station or device is provided including a frame. The frame includes a base portion for mounting onto a wall, and a platform portion pivotally coupled to the base portion. The platform portion includes a first section and two spaced apart arms extending from the first section. A bracket is coupled to the base portion for supporting the platform portion first section while allowing the platform portion first section to rotate relative to the bracket. Such rotation of the first section causes the platform portion to pivot relative to said base portion. A base covers at least a portion of the base portion and a platform extends over at least a portion of the frame platform portion for supporting the baby. In another exemplary embodiment, the platform has a first portion defining a supporting surface for supporting the baby and a second portion, such that the arms are sandwiched between the first and second platform portions. In another exemplary embodiment, a first stop member extends from the base portion, and a second stop member extends from the platform portion, such that engagement of the first stop member by the second stop member stops the rotation of the first section relative to the bracket in a first direction. In yet another exemplary embodiment, each of the arms is a plate extending along a generally vertical plane. In yet a further exemplary embodiment, the frame platform portion first section is a tubular member having a first and a second end, and a first of the arms is connected to the first end and a second of the arms is connected to the second end. In another exemplary embodiment, the frame platform portion first section has end portions which curve, and the first and second ends of the tubular member each have an oval cross-section along a plane parallel to a plane generally perpendicular to a portion of the first section between the end portions. The tubular member first end oval cross-section is connected to the first arm and the tubular member second end oval cross-section is connected to the second arm. In yet another exemplary embodiment, the first arm is welded to the tubular member circumferentially along the first end and the second arm is welded circumferentially along the second end. In a further exemplary embodiment, the second stop member is an arcuate member, and the frame platform portion first section is a tubular member. The arcuate second stop member is connected to tubular member outer surface. In yet a further exemplary embodiment, the second stop member is an arcuate member, and the arcuate second stop member is connected to the tubular member outer surface. In another exemplary embodiment, the frame base portion includes two spaced apart lateral members interconnected by two spaced apart transverse members. In yet another exemplary embodiment, a first support member extends from a first of the lateral members and a second support member extends from a second of the lateral members and the bracket is attached to the first support member. With this exemplary embodiment, the device further includes another bracket attached to the second support member and supports the platform portion first section and allows the platform portion first section to rotate relative to said another bracket. In yet another exemplary embodiment, the device further includes a third stop member extending from the base portion and a fourth stop member extending from the platform portion. In yet a further exemplary embodiment, the first stop member is connected to the first support member and the third stop member is connected to the second support member. In an exemplary embodiment, the frame includes stop sections that engage each other to stop rotation of the frame platform portion relative to the frame base portion to a generally horizontal position.

In another exemplary embodiment a baby supporting station or device is provided which includes a frame. The frame includes a first portion for mounting onto a wall and a second portion pivotally coupled to the first portion and rotatable between a first position and a second position. A first stop section is defined on the first portion, and a second stop section is defined on the second portion, such that when the second stop member engages the first stop member it stops the second portion at the second position. In an exemplary embodiment, the second position is a generally horizontal position. A first surface covers at least a portion of the first portion, and a second surface covers at least a portion of the second portion. In a further exemplary embodiment, the second portion includes a main section and two arm sections extending from opposite sides of said main section. In an exemplary embodiment, each of the arm sections is generally flat and extends along a generally vertical plane. In a further exemplary embodiment, the second portion includes a tubular section and the second stop member is an arcuate member extending from an outer surface of the tubular section. In another exemplary embodiment, the first portion includes two spaced apart members interconnected by at least one other member. In another exemplary embodiment the second portion includes a section having a longitudinal axis and two spaced apart arms extending from the section, such that the second portion section is rotatable about the longitudinal axis when the second portion is pivoted relative to the first portion. In yet another exemplary embodiment the two spaced apart arms are plate like structures each extending along a generally vertical plane. In yet a further exemplary embodiment, the second portion includes two spaced apart members interconnected by another member. In yet another exemplary embodiment, the first portion includes two spaced apart members interconnected by at least one other member. In a further exemplary embodiment, the second portion another member includes a longitudinal axis and is rotatably coupled to the first portion such that the second portion another member is rotatable about the longitudinal axis. In yet another exemplary embodiment, the first and/or the second stop section(s) extend from their corresponding frame portions. In yet a further exemplary embodiment, at least one of the first and second stop sections is a separate member attached to the frame.

In another exemplary embodiment, a baby supporting device is provided having a folding frame having a first portion and a second portion that rotates relative to the first portion for folding the frame. The device also includes a first surface covering at least a portion of the first portion, and a second surface for supporting the baby, said second surface covering at least a portion of the second portion. In a further exemplary embodiment, the device includes a first stop section defined on the first portion, and a second stop section defined on the second portion, such that the second stop section engages said first stop section for stopping rotation of the second portion relative to the first portion.

DETAILED DESCRIPTION OF THE INVENTION

In the following description, only certain exemplary embodiments of the present invention are shown and described by way of illustration. As those skilled in the art would recognize, the invention may be embodied in many different forms and should not be construed as being limited only to the embodiments set forth herein.

It should be noted that the terms "upper" and "lower" as used herein are terms used to denote the relative position of objects and not necessarily the exact position of such objects. For example, a "lower" object, may in certain situations be located over an "upper" object.

In an exemplary embodiment of the present invention, a baby changing station ("BCS") is provided that includes a frame. The frame includes a base portion and a platform portion. The frame platform portion is pivotally coupled to the frame base portion. The frame in an exemplary embodiment is formed from metallic materials. However, in other embodiments, it may be formed from other high strength materials, such as composite materials. The frame base portion is mountable onto a wall. A cover is mounted over the base frame portion. Such cover may be mounted to the base frame portion directly and/or to the wall. A platform is mounted over the frame platform portion.

Figure 1:
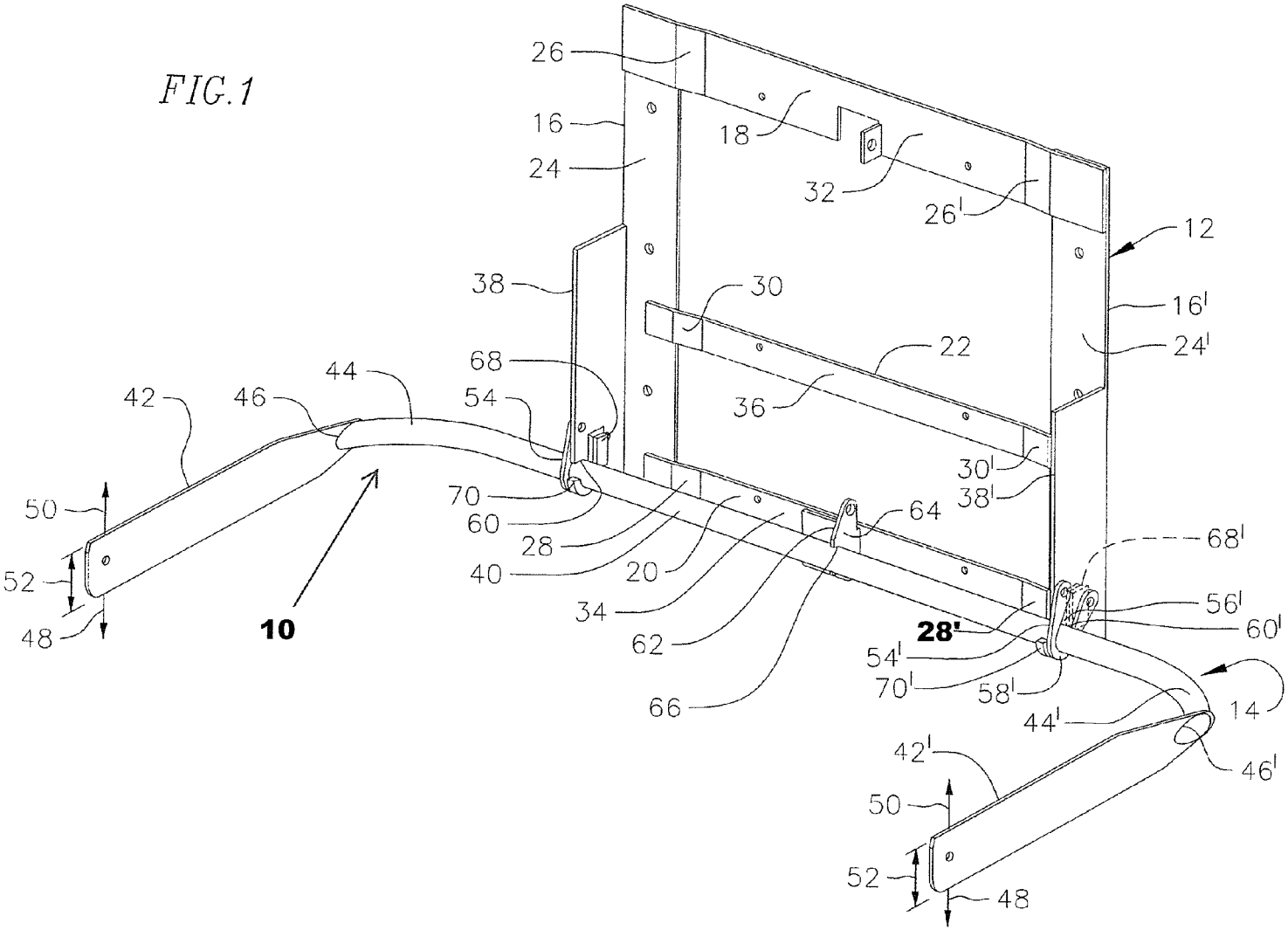
FIG. 1 is a perspective view of an exemplary embodiment frame incorporated in an exemplary embodiment baby changing station of the present invention.

An exemplary BCS of the present invention includes a frame 10 having frame base portion 12 and frame platform portion 14 as shown in FIG. 1. In an exemplary embodiment as shown in FIG. 1, the frame base portion is generally a rectangular or a square member formed by first and second lateral members 16, 16', respectively, which are interconnected by first and second transverse members 18 and 20, respectively. In an exemplary embodiment, a third transverse member 22 may be provided interconnecting the two lateral members 16, 16'. In the shown exemplary embodiment, the third transverse member 22 is positioned between the first and second transverse members 18 and 20. In the shown exemplary embodiment, each of the lateral members is welded to the transverse members. In other exemplary embodiments, these members may be connected to each other using other fastening means such as adhesives or fasteners. In an exemplary embodiment, as shown in FIG. 1, the transverse members are connected to a front surface 24, 24' of each of the lateral members. In the shown exemplary embodiment, the first, second and third transverse members include joggled portions 26, 28 and 30, respectively, proximate the first lateral member 16 and joggled portions 26' 28' and 30', respectively proximate the second lateral member 16'. In this regard, middle portions 32, 34, and 36 of the transverse members are set back from the front surfaces 24, 24' of the lateral members.

A member 38, 38', referred to herein as a "support member" extends from each of the lateral members 16, 16', respectively. In the shown exemplary embodiment each of these members is a flat panel which may be welded or otherwise attached to its corresponding lateral member or may be integrally formed with its corresponding lateral member. For example, the member 38, 38' may be part of the lateral member 16, 16', respectively and then bent forward, as for example shown in FIG. 1.

In an exemplary embodiment as shown in FIG. 1, the frame platform portion 14 includes a main section 40 which is generally tubular and which is pivotally coupled to the frame base portion so as to be able to rotate about a central longitudinal axis of the main section. At either end of the tubular section are attached generally flat arm portions 42 and 42'. The arm portions 42, 42' in the exemplary embodiment shown in FIG. 1 are welded onto the ends of the main section 40. In an exemplary embodiment, opposite end portions 44, 44' of the main section 40 are curved. In the exemplary embodiment shown in FIG. 1 where the end portions 44, 44' are tubular and curved, they have an oval cross-section 46, 46' as viewed along the plane of their corresponding arm portions 42, 42' which is parallel to a plane generally perpendicular to a main section portion between the end portions. If a straight tubular section is used as the main section without having curved end portions, the cross-section of the ends of the main tubular section as viewed along such plane of the their corresponding arm portions would be circular. In the shown exemplary embodiment, a transverse load (i.e., a load directed downward or upward as shown by arrows 48, 50, respectively) on each arm will be reacted in shear along the oval cross-sections of the tubular end portions. In addition, by having the arm portions being flat members that are oriented along a generally vertical plane and having a height 52, they are able to withstand a higher bending loads along their length, i.e., loads which are caused when a force is applied along arrows 48 or 50 then if they were members of shorter heights.

Figure 2:
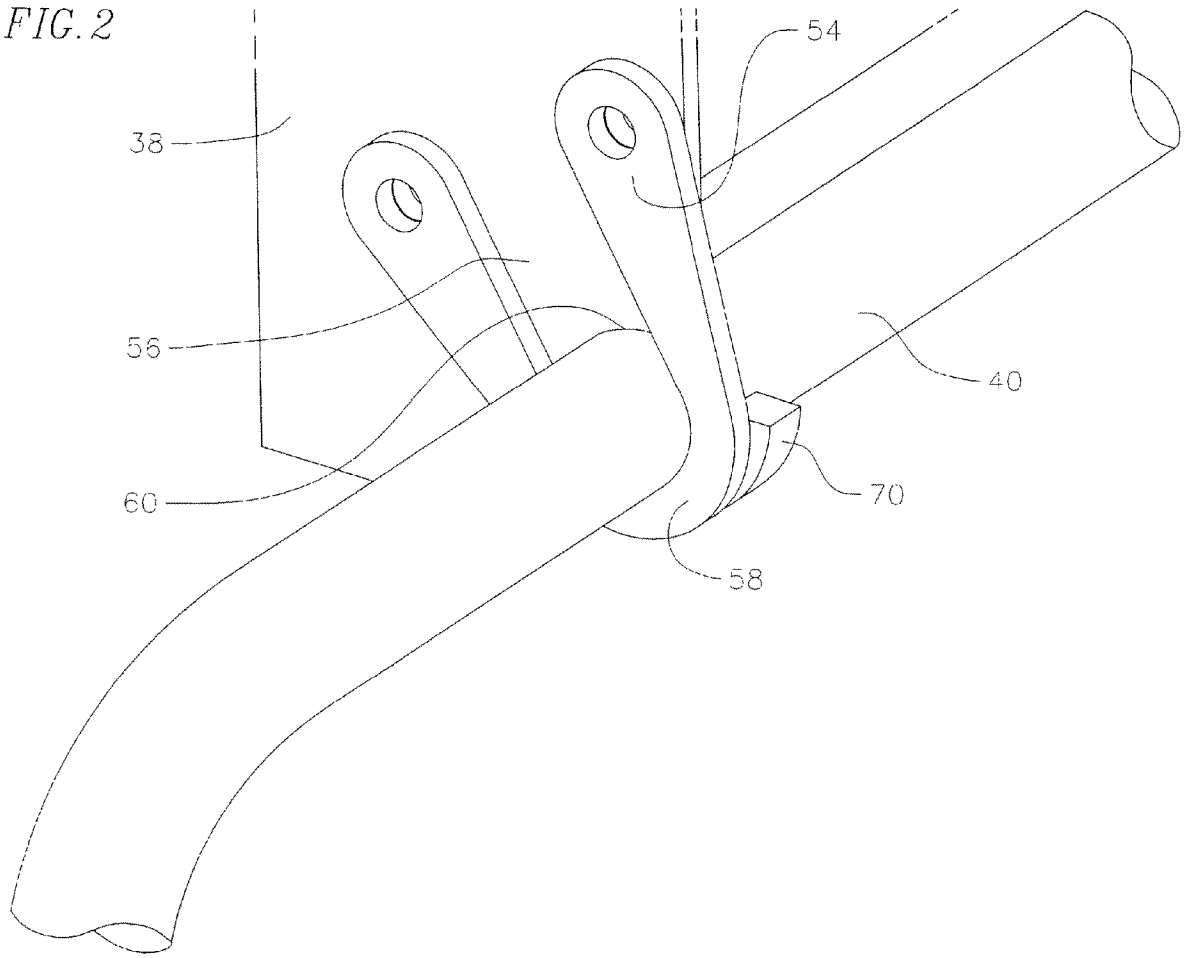
FIG. 2 is a partial perspective view of the frame shown in FIG. 1 showing a bracket supporting a platform portion of the frame.

In an exemplary embodiment, as shown in FIGS. 1 and 2, a bracket portion (referred to herein as a "bracket" for convenience) 54, 54' is attached to the support members 38, 38', respectively. More specifically, each bracket 54, 54' is a generally U-shaped defining a channel 56, 56' having a curved base 58, 58' to accommodate frame platform main section 40. In the shown exemplary embodiment, the support members 38, 38' have a cut-out 60, 60' complementary to the shape of the main section 40 of the frame platform portion. In this regard, the main section 40 is sandwiched between the cut-outs 60, 60' formed on the support members 38 and 38' and the corresponding brackets 54, 54', respectively such that it is supported by the brackets 54, 54' while being able to rotate relative to the brackets 54, 54' and the support members 38, 38'. In an exemplary embodiment, a bracket 62 may extend from the second transverse member 20 proximate the middle of the transverse member. In the shown exemplary embodiment, the bracket 62 has a portion 64 extending forward of the transverse member 20. A cut-out 66 in the shape of a portion of a circle complementary to the outer surface of the tubular member 40 defining the main section of the frame platform portion is formed such that the tubular member defining the main section is fitted within the cut-out and is able to rotate relative to the cut-out. In an exemplary embodiment, the cut-out is formed such that when the tubular member is inserted in the cut-out, a portion of the bracket member 64 extends underneath the tubular member for providing support.

In other exemplary embodiments, instead of a tubular main section, the frame platform portion main section may have other geometric shapes in cross-section. For example, the main section may be polygonal in cross-section as viewed along a vertical plane. In such case, the section may have to be modified in the areas that it is supported by the brackets 54 so as to allow it to rotated relative to the brackets.

A stop member 68, 68' is attached to each of the support members 38, 38'. In an exemplary embodiment, the stop members 68, 68' may be welded or otherwise attached to the support members or may be formed integrally with the support members. It should be noted that in an exemplary embodiment, the brackets 54, 54' are attached to exterior surfaces of the support members 38, 38'. With this exemplary embodiment, the stop members 68, 68' are attached to the interior surfaces of their respective support members 38, 38'. In other exemplary embodiments, this arrangement may be reversed where the brackets are attached to the interior surfaces of the support members and the stop members are attached to the exterior surfaces. In yet a further exemplary embodiment, a bracket may be attached to an exterior surface of one support member while the other bracket is attached to an interior surface of the other support member and the stop members are attached to their respective opposite surfaces.

Figure 3:
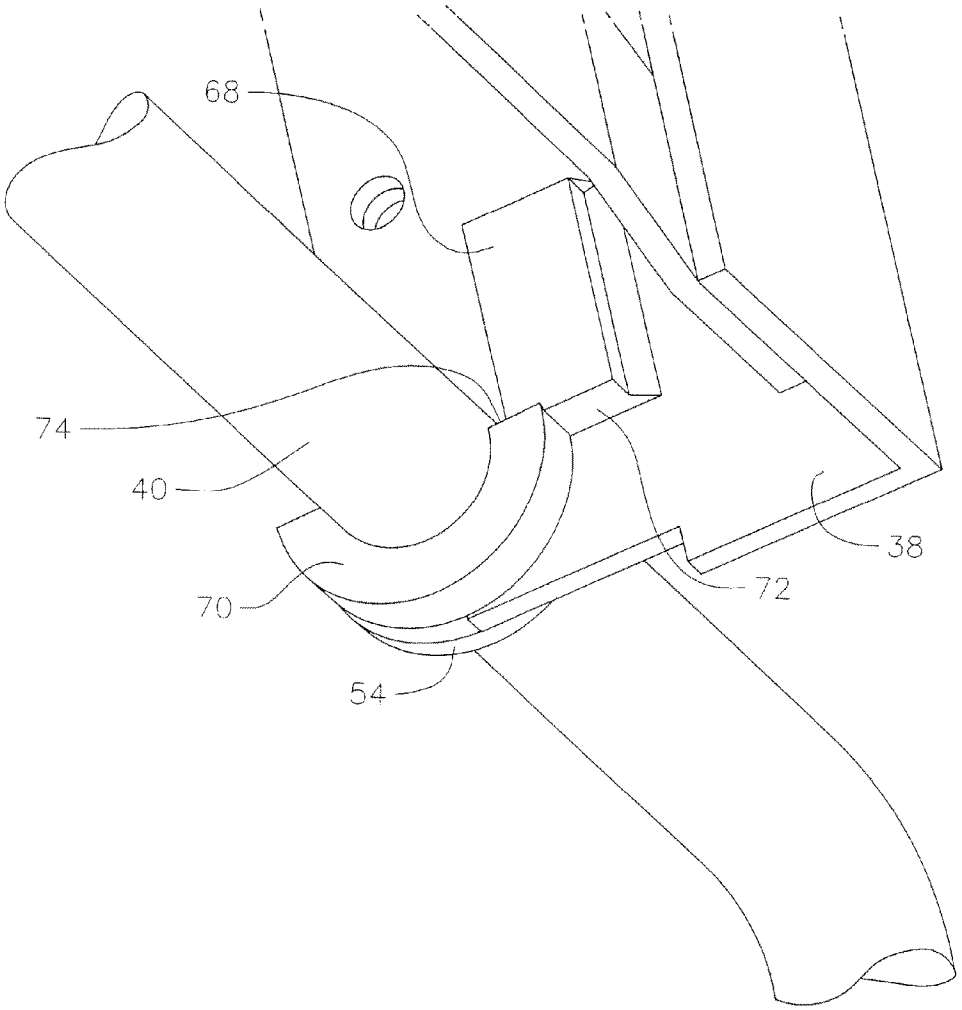
FIG. 3 is a partial perspective view of the frame shown in FIG. 1 showing a stop bracket and stop member incorporated in the frame.

Stop brackets 70 and 70' are attached or otherwise formed on the main section 40 of the frame platform portion so as to be able to make contact with a stop surface 72, (72' not shown) of the stop members 68, 68'. In an exemplary embodiment as shown in FIGS. 1, 2 and 3, the stop brackets 70, 70' are arcuate members welded onto the main section of the frame platform portion. The stop brackets, 70, 70' are positioned such that when the frame platform portion is rotated relative to the frame base portion at an angle so that the frame platform portion is generally horizontal, a stop surface 74, (74' not shown) of the stop bracket contacts the corresponding stop surface 72, 72' of the stop members preventing the further rotation of the frame platform portion relative to the frame base portion. It should be noted that when the stop surface of the stop bracket engages the stop surface of the stop member, the load applied to each stop bracket is reacted as a hoop shear stress between the stop bracket and the tubular main section 40 of the frame platform portion along the outer surface of the tubular main section 40. This provides for a larger contact area length between the stop bracket of the main generally tubular section, thus allowing a larger load to be reacted through the stop bracket, i.e., allowing the stop bracket to withstand a higher load prior to failing, e.g., separating from the main tubular section. The load that may be carried by the stop members may be increased by increasing the contact area between each stop member and the structure on which it is mounted. For example, this may be accomplished by using an arcuate stop member that has a longer arc and thus is attached along a longer circumferential portion of the tubular main section 40. It may also be accomplished by using wider stop members.

Figure 4:
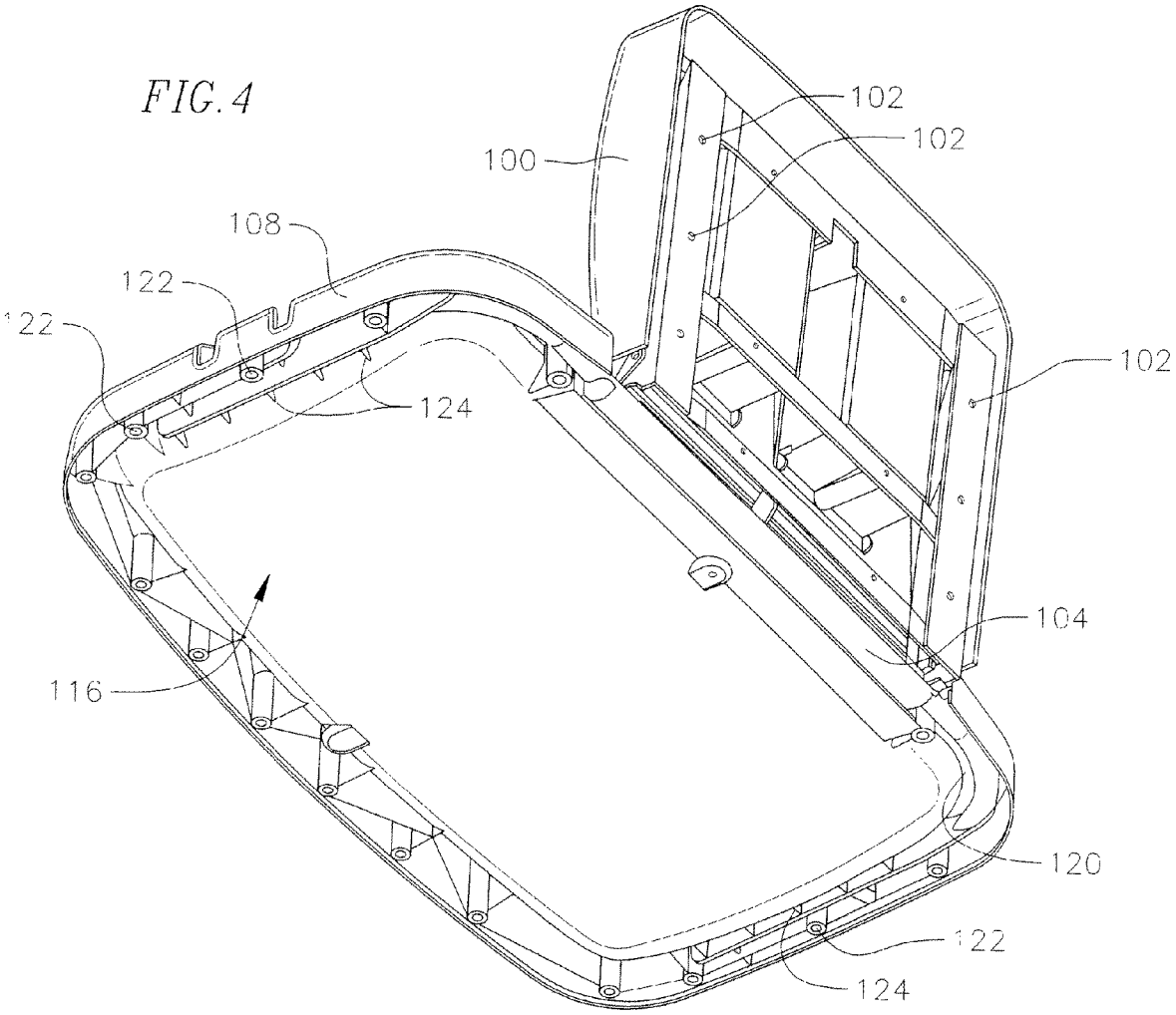
FIG. 4 is a bottom perspective view of an exemplary embodiment baby changing station incorporating the frame shown in FIG. 1 absent a lower piece of a platform.
Figure 5:
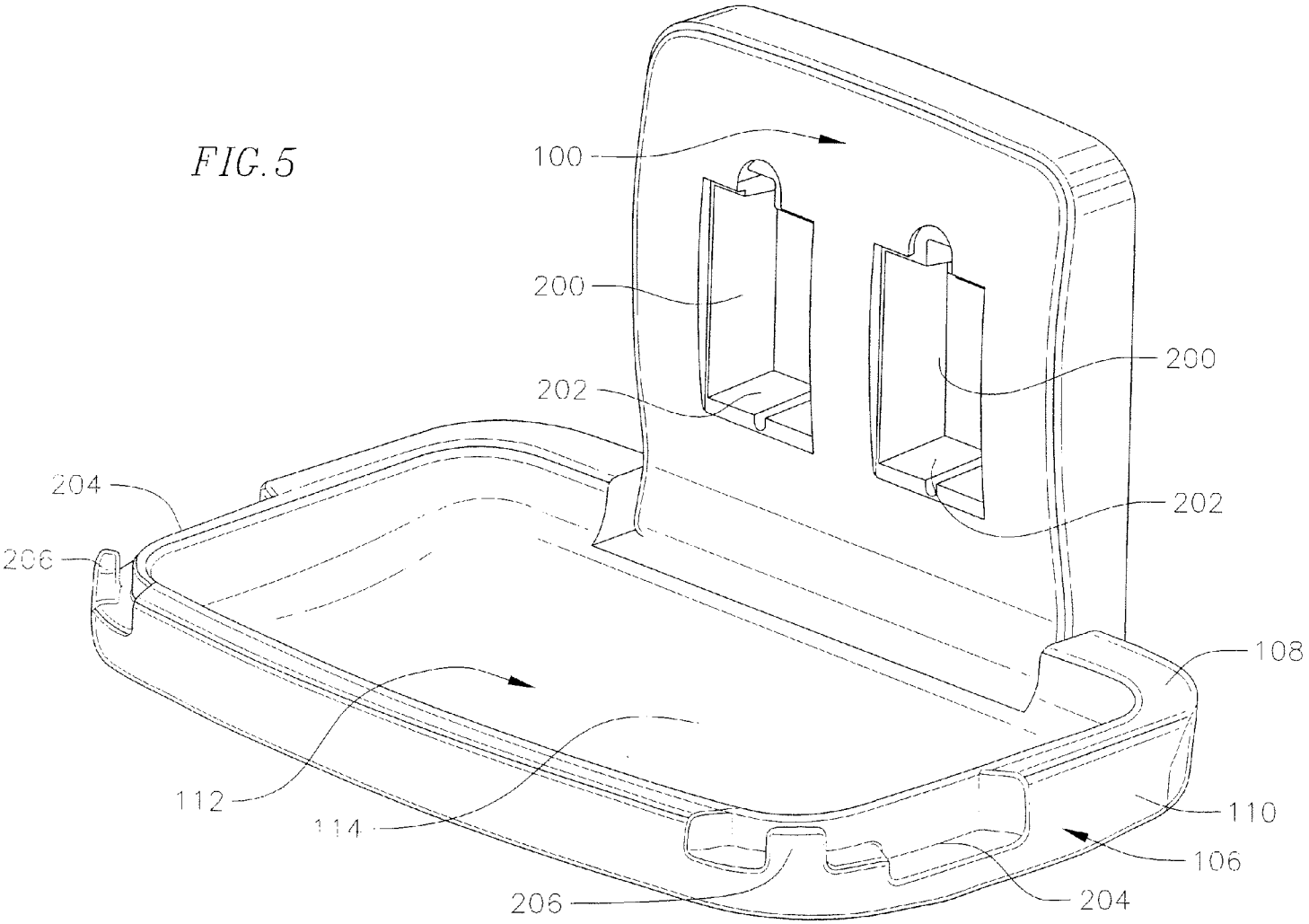
FIG. 5 is a perspective view of an exemplary embodiment baby changing station of the present invention.

In an exemplary embodiment, the frame base portion is mounted onto a wall. The frame may be bolted onto a wall or otherwise fastened or attached to a wall using other fasteners and/or adhesives. A base cover 100 forming the base is mounted over the frame so as to hide the frame. The base cover may be mounted onto the frame or may be mounted directly onto the wall. In an exemplary embodiment, the frame base portion is placed against the wall, and the base cover is then placed over the frame base portion. Fasteners are then used to fasten the base cover onto the frame through fastener openings 102 and onto the wall (FIG. 4). In other words, the fasteners are used to fasten both the frame and the cover to the wall. In an exemplary embodiment as shown in FIGS. 4 and 5, the base cover, when mounted over the base frame portion, covers the base frame portion as well as the portion 104 of the main member of the frame platform portion between the support members 38, 38'.

A platform 106 in an exemplary embodiment is formed in two pieces, an upper piece 108 and a lower piece 110. The upper piece has an external surface 112 defining a support surface 114. On its inner surface 116, the upper piece defines a gap 120 for receiving the frame platform portion. In the exemplary embodiment, where the base cover covers the portion 104 of the frame platform portion main member, the remaining portion of the frame platform portion is received in the gap 120. It should be noted that the gap may be a groove or defined by spaced apart structures as for example pegs 122 which are spaced apart from ribs 124. In an exemplary embodiment, the gap has a width that varies as necessary for accommodating the various portions of the frame platform portion with minimal sideway play. In another exemplary embodiment, the gap may be defined entirely on the lower piece, or entirely on the upper piece, or partly on each of the upper and lower pieces. In another exemplary embodiment, a gap may or may not be used and the platform upper piece is fastened on the frame platform portion using fasteners or by having features that would allow it to snap onto the frame platform portion. The lower piece 110 may in an exemplary embodiment be fastened to the upper piece and/or to the frame platform portion sandwiching the frame platform portion between the upper and lower pieces. In other exemplary embodiments, the two platform pieces may be "snap" fitted together. In another exemplary embodiment, the platform may be formed as a single piece that that has rear openings for receiving the frame platform portion arms. In an exemplary embodiment the platform, whether formed in two pieces, or a single member having openings to accommodate the frame platform portion, may be formed by blow molding. The base cover may also be formed blow molded.

In another exemplary embodiment, any of the platform, platform pieces and/or the base cover may be formed by other methods such as injection molding. In other exemplary embodiments, plastics, resinous, metallic or other materials may be used to form the base cover or the platform or platform pieces.

As can be seen, in one exemplary embodiment, the frame may be mounted onto a wall by securing the frame base portion onto a wall and the base cover and the pieces forming the platform are fitted over their corresponding frame portions afterwards. In this regard when the base cover and/or platform pieces are worn or mutilated, they may be easily replaced without having to replace the frame. In other words, the base cover and platform pieces may be removed exposing the entire frame which may then be outfitted with another base cover and platform pieces.

In an exemplary embodiment, the base cover forming the base may be formed with one or more depressions 200, as for example shown in FIG. 5 which provide shelves 202 for storing materials which are used when changing diapers, as for example lotions and the like. In addition, in the exemplary embodiment shown in FIG. 5, the base is much narrower than the platform such that when the platform is closed relative to the base, it completely encapsulates the base. With this exemplary embodiment, depressions 204 are formed on opposite ends of the platform to provide grips for allowing the user to pull and rotate the platform relative to the base such that the platform comes to a horizontal position where the stop brackets engage their corresponding stop members. In addition, the platform may be formed with pegs 206 to allow the user to hang their bags, as for example, a diaper bag.

As can be seen with the exemplary embodiment BCS, the loads applied to the BCS, for example by the weight of a baby or a person leaning on the BCS platform and all reacted onto the frame which due to its design is capable of withstanding higher loads and especially loads greater than those that are withstood by conventional baby changing stations which typically react the loads on their plastic base and platform. In this regard, the base cover and platform do not have to react the such loads. Consequently they may be formed from materials of lower strength.

Although the present invention has been described and illustrated to respect to multiple embodiments thereof, it is to be understood that it is not to be so limited, since changes and modifications may be made therein which are within the full intended scope of this invention as hereinafter claimed. For example, in another exemplary embodiment, the frame base portion may only have two lateral members as for example, members 16 and 16' that are directly mounted onto to a wall. Support members 38 and 38' extend from the lateral members. This embodiment does not require that the frame base portion include the transverse members.

What is claimed is:

1. A baby supporting device comprising:

a frame comprising, a base portion for mounting onto a wall, a platform portion rotatably coupled to the base portion, said platform portion comprising a first section comprising at least a portion comprising a *section* longitudinal axis and two spaced apart arms extending from the first section, *wherein each arm has an arm longitudinal axis and extends longitudinally along its arm longitudinal axis from the first section,* wherein said platform *portion* rotates relative to the base portion about said *section* longitudinal axis, wherein a *generally horizontal* plane along[, or generally parallel to,] said *section* longitudinal axis intersects said first section and said two spaced apart arms *when said platform portion is rotated to a position relative to the base portion, and wherein the arm longitudinal axis of at least one of said arms is along said plane when said platform portion is rotated to said position,* a first stop member on said first section, wherein the base portion comprises a bracket, wherein said bracket supports said platform portion first section at a location between said arms and allows said platform portion first section to rotate relative to said bracket, whereby rotation of said first section causes said platform portion to pivot relative to said base portion, and a second stop member connected to the bracket for engaging the first stop member for stopping the rotation of the first section relative to the bracket in a direction; and a platform separate and removable from said frame for supporting the baby extending over at least a portion of said frame platform portion.

2. The device as recited in claim 1 wherein the first stop member is an arcuate member, wherein the frame platform portion first section is a tubular member.

3. The device as recited in claim 1 wherein said platform comprises a first portion defining a supporting surface for supporting said baby and a second portion, wherein said arms and at least a portion of the first section are sandwiched between said first and second platform portions.

4. The device as recited in claim 1 wherein the frame base portion comprises two spaced apart lateral members interconnected by at least a transverse member.

5. The device as recited in claim 4 wherein a first support member extends from a first of said lateral members and a second support member extends from a second of said lateral members wherein a first bracket member is attached to the first support member and wherein the device further comprises a second bracket member attached to the second support member, wherein said bracket comprises said first support member and said first bracket member, wherein another bracket comprises said second support member and said second bracket member, and wherein said another bracket supports said platform portion first section and allows said platform portion first section to rotate relative to said another bracket.

6. The device as recited in claim 5 further comprising a third stop member extending from said platform portion first section and a fourth stop member extending from said base portion.

7. The device as recited in claim 6 wherein the second stop member is connected to said bracket and said fourth stop member is connected to said another bracket.

8. The device as recited in claim 7 wherein the second stop member is connected to said first support member and wherein the fourth stop member is connected to said second support member.

9. The device as recited in claim 1 wherein the stop members engage each other to stop rotation of the frame platform portion relative to the frame base portion at a generally horizontal position.

10. The device as recited in claim 1 wherein the arms are welded to the first section.

11. The device as recited in claim 1 wherein the first section extends from a first end to a second end and wherein one of the arms continues and extends from the first end and the other of the arms continues and extends from the other end.

12. The device as recited in claim 1 wherein the stop members are located adjacent said location.

13. The device as recited in claim 1 wherein the bracket surrounds at least a portion of the first section.

14. The device as recited in claim 13 wherein said platform comprises a first portion defining a supporting surface for supporting said baby and a second portion, wherein said arms and at least a portion of the first section are sandwiched between said first and second platform portions.

15. The device as recited in claim 1 further comprising another bracket, wherein said another bracket supports at least a portion of said platform portion first section and allows said platform portion first section to rotate relative to said another bracket.

16. A baby supporting device comprising:

a frame comprising, a first portion for mounting onto a wall[;], a second portion pivotally coupled to the first portion and rotatable between a first position and a second position, wherein the second portion comprises a section having at least a portion having a *section* longitudinal axis and two spaced apart arms extending from said section, *wherein each arm has an arm longitudinal axis and extends longitudinally along its arm longitudinal axis from the section,* wherein a *generally horizontal* plane along[, or generally parallel to,] said *section* longitudinal axis intersects said section and said two spaced apart arms *when said second portion is rotated to a position relative to the first portion, and wherein the arm longitudinal axis of at least one of said arms is along said plane when said second portion is rotated to said position,* wherein said second portion section is rotatable about said *section* longitudinal axis when the second portion is pivoted relative to the first portion, *and* wherein said second portion is coupled to the first portion at a location between said spaced apart arms, a first stop section defined on the first portion[;], and a second stop section defined on the second portion, wherein said second stop section engages said first stop section for stopping said second portion at the second position; and a first surface separate and removable from said frame covering at least a portion of said second portion.

17. The device as recited in claim 16 wherein the second portion comprises a tubular section and wherein the second stop section is an arcuate member extending from an outer surface of said tubular section.

18. The device as recited in claim 16 wherein the first portion comprises two spaced apart members interconnected by at least one other member.

19. The device as recited in claim 16 wherein the first stop section extends from the first portion.

20. The device as recited in claim 16 wherein the second stop section extends from the second portion.

21. The device as recited in claim 16 wherein at least one of said first and second stop sections is separate member attached to the frame.

22. The device as recited in claim 16 wherein the second position is a generally horizontal position.

23. The device as recited in claim 16 wherein the arms are welded to the first section.

24. The device as recited in claim 16 wherein the section extends from a first end to a second end and wherein one of the arms continues and extends from the first end and the other of the arms continues and extends from the other end.

25. The device as recited in claim 16 wherein the stop sections are located adjacent said location.

26. The device as recited in claim 16 wherein at least a portion of the second portion is surrounded and is supported by said first portion.

27. A baby supporting device comprising:

a bracket for coupling onto a wall;

a member supported by the bracket, wherein at least a *major* portion of said member has a longitudinal axis, wherein said member is rotatable about said longitudinal axis relative to the bracket;

a first arm extending from the member *along a first arm longitudinal axis*;

a second arm extending from the member *along a second arm longitudinal axis* and spaced apart from the first arm, wherein said bracket supports said member at a location between said arms, wherein a *generally horizontal* plane along[, or generally parallel to,] said *member* longitudinal axis intersects said member and said first and second arms *when said member is rotated to a position relative to the bracket, and wherein the arm longitudinal axis of at least one of said arms is along said plane when said member is rotated to said position*; and a baby supporting surface supported by said first and second arms separate and removable from said first and second arms, wherein said supporting surface is rotatable about said longitudinal axis;

a first stop member mounted on the bracket; and a second stop member mounted on said member supported by the bracket, wherein said second stop member engages said first stop member for limiting the rotation of the member supported by the bracket about its longitudinal axis relative to the bracket.

28. The device as recited in claim 27 wherein the arms are welded to the member.

29. The device as recited in claim 27 wherein the member extends from a first end to a second end and wherein one of the arms continues and extends from the first end and the other of the arms continues and extends from the other end.

30. The device as recited in claim 27 wherein the stop members are located adjacent said location.

31. The device as recited in claim 27 wherein the bracket surrounds at least a portion of the first member.

32. A baby supporting device comprising:

a frame comprising, a base portion for mounting onto a wall, a platform portion rotatably coupled to the base portion, said platform portion comprising a first section comprising at least a *major* portion comprising a longitudinal axis and two spaced apart arms extending from the first section, wherein said platform rotates relative to the base portion about said longitudinal axis a first stop member on said first section, wherein the base portion comprises a bracket, wherein said bracket supports said platform portion first section at a location between said arms and allows said platform portion first section to rotate relative to said bracket, whereby rotation of said first section causes said platform portion to pivot relative to said base portion, a second stop member connected to the bracket for engaging the first stop member for stopping the rotation of the first section relative to the bracket in a direction; and a platform for supporting the baby extending over at least a portion of said frame platform portion, wherein the first arm is welded to [the tubular member circumferentially along the first end and the second arm is welded circumferentially along the second end] *a first end of the first section and the second arm is welded to a second end of the first section.*

*33. The device as recited in claim 15, wherein said bracket and said another bracket are spaced apart from each other and wherein said at least a portion of said first section extends from at least the bracket to said at least another bracket.*

*34. The device as recited in claim 33, wherein said bracket and said another bracket define outermost support locations for said platform portion first section.*

*35. The device as recited in claim 16, wherein said second portion is coupled to the first portion at a first location and a second location, said second location spaced apart from the first location, and wherein said at least a portion of said section of said second portion extends at least from said first location to at least said second location.*

*36. The device as recited in claim 35, wherein said first and second locations define outermost support locations where said second portion is coupled to the first portion.*

* * * * *